United States Patent [19]

Abe et al.

[11] Patent Number: 4,894,533

[45] Date of Patent: Jan. 16, 1990

[54] OPTICAL ROTARY ENCODER

[76] Inventors: Hiraku Abe, 8-1-305 Koinaba-cho; Yoji Shimojima, 83-4 Aza-Kanagorin, Inaba; Yoshihiro Takahashi, 93-2 Aza-Kanagorin, Inaba, all of Furukawa-shi, Miyagi-ken, Japan

[21] Appl. No.: 220,998

[22] Filed: Jul. 15, 1988

Related U.S. Application Data

[63] Continuation of Ser. No. 915,735, Oct. 6, 1986, abandoned.

[30] Foreign Application Priority Data

Oct. 7, 1985 [JP] Japan ............................ 60-152469[U]

[51] Int. Cl.⁴ ............................................. G01D 5/34
[52] U.S. Cl. ................................ 250/231 SE; 250/229
[58] Field of Search ............ 250/231 SE, 229, 237 G; 356/372, 375, 395; 324/175; 340/347 P; 341/13

[56]  References Cited

U.S. PATENT DOCUMENTS 3,991,477  11/1976  Zipin et al. ........................... 356/395

FOREIGN PATENT DOCUMENTS 59-10755  8/1985  Japan ............................ 250/231 SE

*Primary Examiner*—David C. Nelms
*Assistant Examiner*—Khaled Shami
*Attorney, Agent, or Firm*—Alan H. MacPherson

[57]  ABSTRACT

An optical rotary encoder eliminates the necessity of relatively positioning a code plate and a click mechanism therefor so that it can be assembled with ease. The code plate is mounted for rotation relative to a stationary plate member, and the click mechanism including a ball and a spring plate is interposed between the code plate and the plate member so that all the members can be incorporated as a single device.

2 Claims, 1 Drawing Sheet

OPTICAL ROTARY ENCODER

This application is a continuation of application Ser. No. 915,735, filed Oct. 6, 1986, now abandoned.

BACKGROUND OF THE INVENTION

This invention relates to a rotary encoder in which an optical element is used, and more particularly to a manually operable optical rotary encoder for use with a mode change-over switch of a video tape recorder (VTR), a manual input device for a numerically controlled machine tool, or the like.

Conventionally, for example in a VTR, when the machine is to be set to one of various ordinary modes such as rewinding, quick feeding, playback, and stopping of a tape, a mode change-over switch is operated to select a signal for a corresponding one of such individual modes. As a result, the selected control signal having a predetermined period is supplied to a motor to drive a tape to run in a direction and at a speed determined in accordance with the mode.

Various types of switches have been proposed for such a mode change-over switch as described above and put into practical use. However, in consideration of durability and reduced production of noises, it is advantageous to use an optical rotary encoder which is of the contactless type.

An example of an optical rotary encoder will be described with reference to FIGS. 4 and 5. An optical rotary encoder shown includes a code plate 1 on a surface of which light reflective portions 1a and non-reflective portions 1b are formed radially in a circumferentially equidistantly spaced relationship. The code plate 1 is secured to a supporting portion 2a of a support member 2, and the support member 2 has an enlarged diameter portion 2b formed below the supporting portion 2a thereof. The code plate 1 and the support member 2 are secured to a manually operable shaft 3. A plurality of notches or serrations 5 are formed on a circumferential periphery of the enlarged diameter portion 2b of the support member 2, and a ball 6 is urged into engagement with one of the notches 5 of the support member 2 by an urging device 4. The urging device 4 is secured to a stationary portion of an apparatus to which the optical rotary encoder is applied and on which the manually operable shaft 3 is mounted for manual rotation. The urging device 4 includes a cylindrical body 4a and a spring 7 accommodated in the cylindrical body 4a for pressing the ball 4 against the notched 5 periphery of the support member 2. A light emitting element 8 and a light receiving element 9 are located in an opposing relationship to the code plate 1. The notched 5 periphery of the support member 2, the ball 6 and the urging device 4 cooperatively constitute a click mechanism 10.

In the prior art device, if the manually operable shaft 3 is rotated relative to the urging device 4, the support member 2 secured to the manually operable shaft 3 is rotated together with the code plate 1. Meanwhile, an incident beam of light a from the light emitting element 8 which irradiates on a surface of the code plate 1 is reflected successively and alternately by the light reflective portions 1a and the non-reflective portions 1b of the code plate 1, and such reflective light b which exhibits changes in quantity of light between a high level and a low level now irradiates on the light receiving element 9. Accordingly, as the code plate 1 rotates a certain amount, the light receiving element 9 will produce a series of pulse signals. Since rotation of the manually operable shaft 3 corresponds to such various operation modes of a VTR as described above, a difference in number of pulses produced and determined by rotation of the manually operable shaft 3 can be used as a mode change-over signal.

However, in such a prior art device as described above, for example if rotation of the manually operable shaft 3 is stopped in a condition in which the beam of light a is incident to a light reflective portion 1a of the code plate 1, the light receiving element 9 will not produce accurate pulse signals. To eliminate this, the click mechanism 10 is provided to assure production of desired pulse signals at any of the predetermined positions with good reproducibility even by manual operation. Due to the presence of the click mechanism 10, as the manually operable shaft 3 is rotated, it can be clickably moved so that it may be stopped at a desired rotational position.

However, the ball 6 of the click mechanism 10 and the urging device 4 are separate from the support member 2 for the code plate 1 and are located adjacent a side of the support member 2. Therefore, it is necessary to position the click mechanism 10 relative to the code plate 1. Accordingly, it is a drawback of the prior art device that assemblage of the device involves complicated operations.

SUMMARY OF THE INVENTION

It is an object of the present invention to provide an optical rotary encoder which eliminates the drawback of the prior art device as described above and can be assembled with ease.

In order to attain the object, according to the present invention, an optical rotary encoder of the type which includes a code plate having a reflective portions and non-reflective portions formed circumferentially in an alternate contiguous relationship thereon, a light emitting element and a light receiving element both located in an opposing relationship to said code plate, and a click mechanism for controlling operation of said code plate, comprises a stationary front plate which is located in an opposing relationship to and associated with said code plate such that said code plate may be positioned and clickably moved relative to said front plate by way of said click mechanism.

Accordingly, the code plate and the click mechanism can be incorporated as a single device. This eliminates the necessity for a complicated operation of relatively positioning the code plate and the click mechanism as is necessitated in prior art devices. Consequently, an optical rotary encoder which can be produced with ease can be provided.

DESCRIPTION OF THE PREFERRED EMBODIMENT

Figure 1:
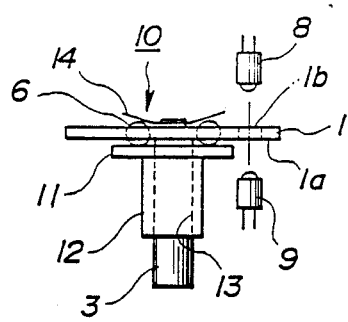
FIG. 1 is a diagrammatic side elevational view of an optical rotary encoder according to an embodiment of the present invention.
Figure 4:
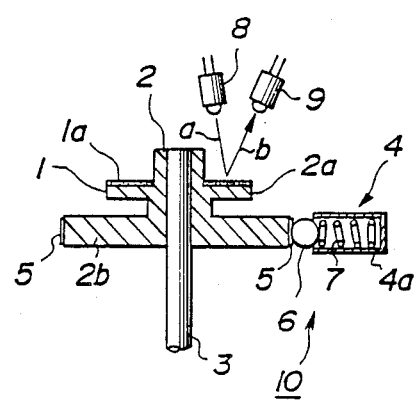
FIG. 4 is a diagrammatic cross sectional view of a typical one of conventional optical rotary encoders.
Figure 2:
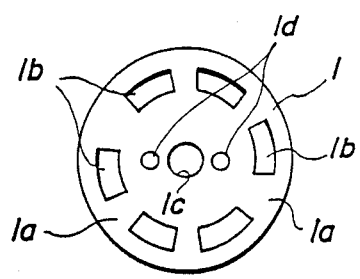
FIG. 2 is a plan view of a code plate of the optical rotary encoder of FIG. 1.
Figure 5:
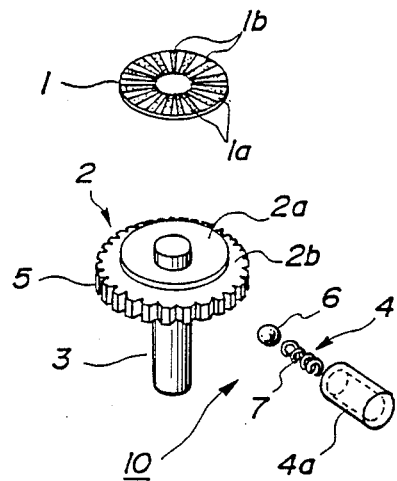
FIG. 5 is a fragmentary perspective view of the optical rotary encoder of FIG. 4.
Figure 3:
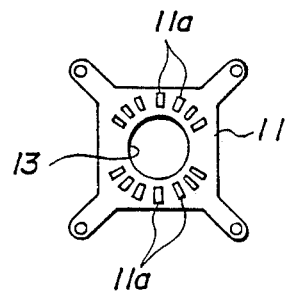
FIG. 3 is a plan view of a front plate of the optical rotary encoder of FIG. 1.

Now, an embodiment of the present invention will be described with reference to FIGS. 1 to 3. It is to be noted that in FIGS. 1 to 3, like members to those described with reference to FIGS. 4 and 5 are represented by like reference numerals.

A code plate 1 is of the light transmissive type and has formed therein a plurality of light passing holes 1b which provide non-reflective portions, and light reflective portions 1a other than the light passing holes 1b. The code plate 1 further has formed at the center thereof a fitting hole 1c in which an end portion of a manually operable shaft 3 is to be fitted. A pair of perforations 1d are formed between the fitting hole 1c and the light passing holes 1b in the code plate 1.

A front plate 11 is disposed in an opposing relationship to the code plate 1 and is secured to a stationary portion of an apparatus not shown to which the optical rotary encoder is applied and on which the manually operable shaft 3 is mounted for manual rotation. The front plate 11 has a sleeve 12 formed to extend downwardly in an integral relationship therefrom. The front plate 11 further has a plurality of openings 11a formed radially on an upper face thereof and a center bore 13 formed to extend from the top thereof through the sleeve 12 for fittably receiving the manually operable shaft 3 therein.

As the manually operable shaft 3 to which the code plate 1 is securely fixed is inserted into the center bore 13 of the sleeve 12 of the front plate 11, the code plate 1 is positioned in an opposing relationship to the front plate 11. A pair of balls 6 are loosely fitted in the pair of perforations 1d of the code plate 1 so that they can move, at lower portions thereof, into and out of the recesses 11a of the front plate 11 while they are resiliently contacted at upper portions thereof by a spring plate 14 secured to an end of the manually operable shaft 3. Accordingly, the balls 6 are resiliently pressed into the recesses 11a of the front side plate 11 under the resilient force of the spring plate 14 and hence will not drop off inadvertently. A light emitting element 8 is disposed in an opposing relationship to a light receiving element 9 so that a beam of light emitted from the light emitting element 8 may pass through an opening of the code plate 1 and be received by the light receiving element 9.

In this manner, according to the present embodiment, a click mechanism 10 which is composed of the balls 6, the recesses 11a of the front plate 11 and the spring plate 14, is constituted in an integral relationship with the code plate 1. Accordingly, the positioning of the click mechanism 10 relative to the code plate 1 necessary with the prior art device as described above can be eliminated.

Operation of the device is similar to the prior arat device described above, and rotational positions of the manually operable shaft 3 are determined for individual operation modes of the apparatus. Accordingly, as the manually operable shaft 3 is rotated to a desired mode position relative to the stationary front plate 11, the code plate 1 is clickably moved over a certain extent under the action of the click mechanism 10. Upon such rotation of the code plate 1, an incident beam of light from the light emitting element 8 passes successively through a certain number of the light passing holes 1b of the code plate 1 and irradiates upon the light receiving element 9. Consequently, the light receiving element 9 produces pulse signals corresponding to the mode set by the manually operable shaft 3 so that a driving source not shown may be operated in accordance with the mode set by the manually operable shaft 3.

Upon such operation of the manually operable shaft 3 as described above, the code plate 1 is clickably moved under the action of the click mechanism 10 in order to prevent the code plate 1 from stopping at an improper position to assure accurate irradiation and interruption of light on and from the light receiving element 9. Accordingly, accurate pulse signals will normally be produced from the light receiving element 9. In other words, the light receiving element 9 will produce desired pulse signals with good reproducibility in response to interruptions and irradiations of light caused by operating the device to a desired mode setting.

It is to be noted that the click mechanism 10 may be modified such that the code plate 1 has a plurality of recesses for removably receiving therein the balls 6 which are accommodated in the front plate 11 while means is provided for pressing the balls 6 into the recesses in the code plate 1.

It may also be possible that a convex spring plate is used in place of the balls of the click mechansim 10 and is mounted for movement into and out of a plurality of recesses formed in the code plate 1.

What is claimed is:

1. An optical rotary encoder comprising:
    a code plate mounted at its center on a rotatable shaft and having a plurality of indicia portions arranged circumferentially at one radial position thereon, retaining means formed in said code plate, and a click member retained by said retaining means so as to project from a surface of said code plate;
    a light emitting element and a light receiving element mounted to a stationary part of said encoder such that light emitted by said light emitting element irradiates said indicia portions of said code plate rotated with said shaft and is provided therefrom to said light receiving element in order to derive position signals indicating corresponding rotational positions of said code plate; and
    a stationary plate mounted in said encoder facing opposite the surface of said code plate having said click member projecting therefrom, said stationary plate having a plurality of recesses formed therein engageable by said click member, said recesses being positioned on the stationary plate in correspondence with definite rotational positions of said code plate to be indicated by the position signals derived from said indicia portions of said code plate,
    wherein said retaining means includes perforations formed through said code plate at another radial position different from that of said indicia portions, and said click member includes balls held in said perforations, and further comprising a spring plate mounted on said shaft on one side of said code plate for resiliently biasing said balls to project from the other side of said code plate in engagement with said recesses of said stationary plate.
2. An optical rotary encoder according to claim 1, wherein said stationary plate has a central hole to allow assembly of said shaft therethrough.

* * * * *